United States Patent Office 2,958,973
Patented Nov. 8, 1960

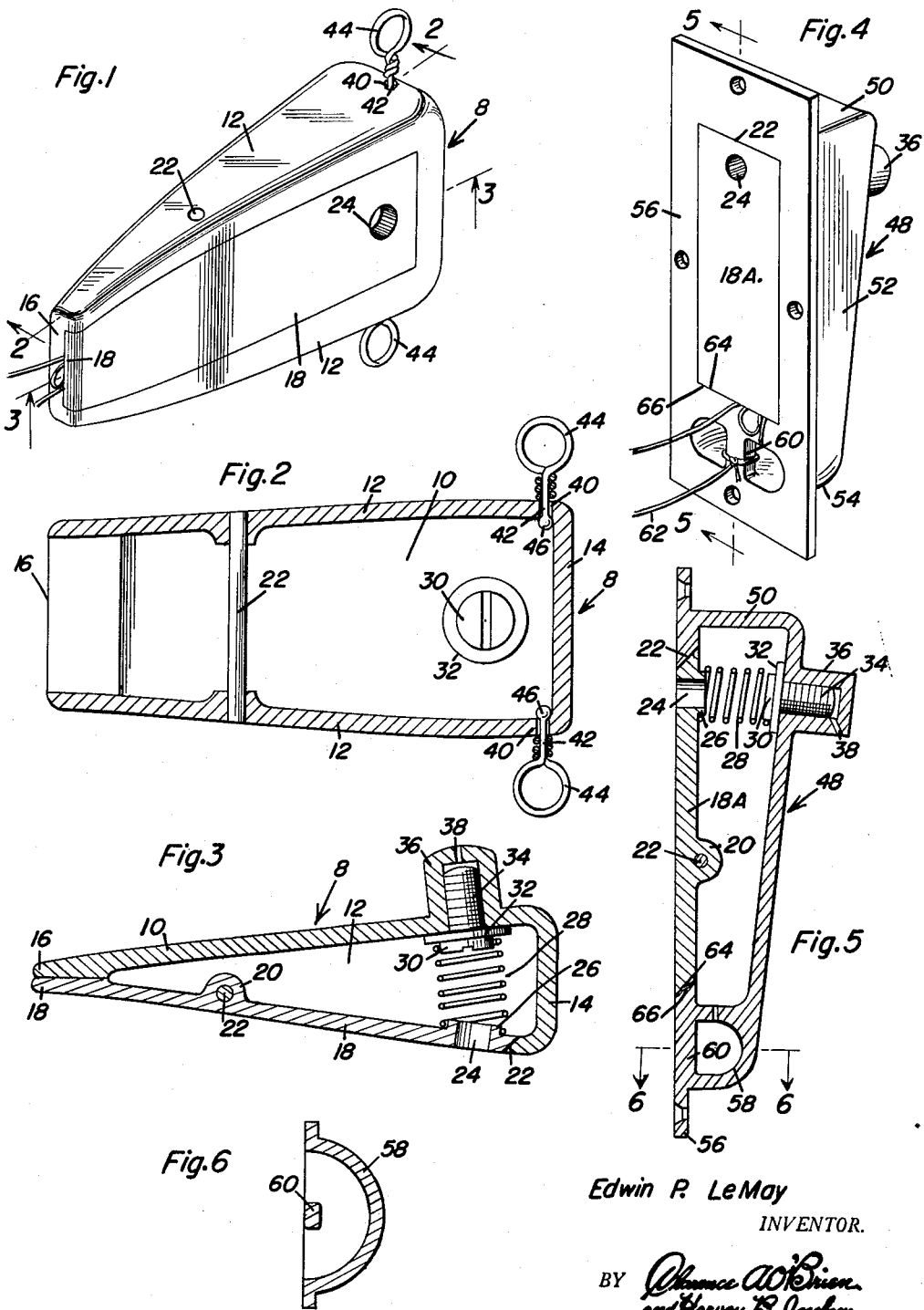

2,958,973

OUTRIGGER AND STERN LINE HOLDING AND RELEASING DEVICES

Edwin P. Le May, 530 Biscayne Blvd., Miami 32, Fla.

Filed Aug. 23, 1957, Ser. No. 679,997

10 Claims. (Cl. 43—43.12)

The present invention relates to an improved device which is adapted for use on both sport and commercial fishing vessels and which is sometimes referred to as a line holding and releasing device or, more simply, a fishing line release.

The main purpose of a fishing line release is to hold the line from fishing reel either at the end of a fishing outrigger or stern of a vessel so that the line will not run off the reel while trolling bait with reel drag set in off position, and to permit the fishing line to drop from holding position between gripping jaws of device when a fish strikes or grabs bait that is being trolled behind vessel at various distances from stern of vessel. The device permits a drop back which allows fish to pick up and/or swallow bait without detecting that the bait on end of fishing line is that of a fisherman.

To promote satisfactory trolling it is customary to employ an outrigger. As is perhaps generally well-known an outrigger has a line that goes through glass, metal or plastic eyes attached to the boom or pole, the line being looped up and the reaches thereof are worked up and down as required. This is herein referred to as the outrigger line and it is to this line that the outrigger type line holder and release is attached for use. A minimal portion of the fishing line beyond the fishing rod and reel is releasably placed between the spring closed gripping jaws of the release. To do this, the guide brings one stretch of the loop-like outrigger line down and, to put the release in position, he pulls down on the other side of the line raising the release so that it will be held aloft as is frequently done when an ordinary clothespin is used as the line release. The use of clothespins and certain patented fishing line releases are objectionable because they do not operate or respond properly to the predetermined tension which is to be expected on the fishing line. Therefore, prior art releases are either too loose or too tight and are ruinous to expensive fishing lines.

With a view toward better solving the line holding and releasing problem the releases herein revealed have been evolved and produced.

Briefly and generically stated, the embodiments disclosed involve the use of a simple, practical and economical device which is characterized by sensitive spring-biased gripping jaws provided on cooperating ends of a pair of opposed hingedly connected jaw members and wherein the spring means employed to obtain the desired jaw tension is readily accessible and adjustable to insure proper response of the jaws.

More specifically, both embodiments of the invention herein disclosed embody a first jaw member having a screw-threaded socket provided with a headed spring retaining and tension adjusting screw, a complemental second jaw member hingedly mounted between its ends on said first member, corresponding end portions of said members having opposed cooperating line gripping and releasing jaws, said second jaw member having a screwdriver hole in line wtih the head of said screw, and also having an annular collar-like boss at one end of the hole and forming an extension of the hole, the head of said screw having a companion boss lined up with said first named boss, and a coil spring interposed between said members and having its ends anchored and retained by said bosses.

Novelty is also predicated on the first member which takes the form of a shell-like base having means for attachment wherever necessary or desired, said base being open along its front, said second member being in the form of a flat plate and acting as a cover for the otherwise open front. The base member is provided adjacent one end with a pair of complemental swivelly mounted ring-like eyes to permit the attachment thereto of an outrigger line (Figs. 1 to 3 inclusive). In the second form the base has outstanding marginal attaching flanges for connection to a stationary support, any part of the vessel or boat, and also has a hollow extension at its lower end provided with a cross member to which one end of a teaser-line may be fastened (Figs. 4 and 5).

Features and advantages in addition to those specified will be apparent in the following description.

In the drawings:

Fig. 1 is a perspective view of the form of the line release adapted for use on an outrigger line;

Figs. 2 and 3 are sections on the lines 2—2 and 3—3 respectively of Fig. 1;

Fig. 4 is a perspective view of a second form or embodiment of the invention which is adapted to be fastened directly on a selected part of a boat or vessel, for example the transom or other portion adjacent the stern;

Fig. 5 is a section on the line 5—5 of Fig. 4; and

Fig. 6 is a section on the line 6—6 of Fig. 5.

In Figs. 1 to 3 the first jaw member comprises a hollow shell-like base 8 of suitable non-corrosive material (wood, metal, plastic, hard rubber). The base has a bottom wall 10, spaced parallel tapering side walls 12 and transverse end connecting wall 14 with the end portion 16 fashioned to provide one gripping jaw. The other jaw 18 which is opposed thereto is formed at one end of a cover forming clip or plate 18 having a bearing 20 hinged on a cross pin 22 mounted on the median portion of the walls 12. The meeting edges 22 (Fig. 3) are bevelled. At this end there is a hole 24 with an inwardly projecting annular collar 26 forming a boss for one end of the coil spring 28. The other end of the spring is anchored on a slotted head or boss 30 forming a part of the head 32 of a screw 34 screwed into a socket member 36 having a suitable drain hole 38. The side flanges adjacent one end of the base are provided with holes 40 to accommodate the shank portions 42 of ring-like eyes 44 held in place by retaining heads 46 (Fig. 2). These eyes are adapted to be connected to the aforementioned outrigger line not shown. With this arrangement the screwdriver may be passed through the hole 24 and through the coils of the spring and engaged with the kerf in the head 30 to adjust the screw to regulate the tension of the spring and consequently the responsiveness of the jaws 16 and 18. As stated this is the outrigger-type release.

The transom attached or vessel-type release in Figs. 4, 5 and 6 comprises a base or first jaw member 48 with marginal walls 50, 52 and 54 forming a hollow casing. The base in this instance is provided with apertured marginal flanges 56 to permit attachment thereof to the transom or other part of a boat. The second jaw member comprises a clip or plate 18A similar to the one described as 18. The hinging means and spring adjusting means is the same here and therefore the same reference numerals are utilized. The lower portion of the base is hollowed out as at 58 and is provided with a cross member 60 to which the teaser-line 62 is fastened in the manner seen in Fig. 4. The jaw surfaces are here denoted by the numerals 64 and 66 respectively.

This form (Figs. 4 to 6) of the invention can be installed on transom, side of hull, covering boards, decks, aft ends of structures or anywhere around aft end of vessels. The lower to the water a line can be trolled, the less chance of tangling or being carried by wind and wave. Also, it permits a (flat line) fisherman's line and rod, usually fishing directly behind vessel, to also be set in a rod holder and be released similar to outrigger release. Many fish first come up behind the vessel and then go to outrigger bait. Also, more fish have been caught directly behind vessels than to the sides of vessel. It is also true that more fish have been lost directly behind vessel because the fisherman jerks rod and line when he gets a strike, many times pulling bait away from fish or he doesn't release line permitting bait to lay on water like a dead fish. Time and time again fishing guides encounter difficulties for not releasing brake and line slowly, counting ten, and then resetting brake. Even fishing with strong tough baits, fishermen lose many fish.

As for the teaser-line on the stern or aft fishing line clip casting, this is something that has been needed for a long time. Teasers are usually dragged along behind vessels to attract fish. There has been no place to tie the end of teaser line so the guide has used all kinds of rigs, cleats, and stern hardware, in most cases teaser line rubs against something causing it to chafe and losing expensive teasers. My teaser line attachment prevents the loss of teasers due to line chaffing, and also gets teasers down close to or into water where teasers work better.

It will be understood that the springs, double-coil springs and caliber adjusting arrangements for the purpose of controlling tension of the jaws in place of the coil spring arrangement depicted fall within the purview of the concept. In addition the minor changes in shape, size, material and rearrangement of components which fall within the spirit of the invention or the invention as claimed may be resorted to in actual practice. Therefore, a more extended description is thought to be unnecessary.

What is claimed as new is as follows:

1. A fishing line release comprising a first jaw member having a screw-threaded socket provided with a headed spring retaining and tension adjusting screw, a complemental second jaw member hingedly mounted between its ends on said first member, corresponding end portions of said members having opposed cooperating line gripping and releasing jaws, said second jaw member having a screwdriver hole in line with the head of said screw, and also having an annular collar-like boss at one end of the hole and forming an extension of the hole, the head of said screw having a companion boss lined up with said first named boss, and a coil spring interposed between said members and having its ends anchored on and retained by said bosses.

2. The structure defined in claim 1, and wherein the first member comprises a hollow shell-like base having means for attachment where desired, said base being open along one face, said second member comprising a plate acting as a cover for the open face of said base.

3. The structure defined in claim 2, and wherein said base is provided adjacent one end with a pair of complemental swivelly mounted ring-like eyes to permit of the attachment thereto of outrigger lowering and raising lines.

4. The structure defined in claim 2, and wherein said base has outstanding marginal attaching flanges for connection to a stationary support and also has a hollowed extension at its lower end provided with a cross-member to which one end of a teaser-line may be fastened.

5. For use in trolling, a fishing line holding and releasing device by way of which a desired drop-back of the attached fishing line may be had: comprising an elongated hollow shell-like base having a line gripping jaw at one end and swivel means at the other end through the medium of which said device may be attached for use to an outrigger line, and a spring-biased clip hingedly and cooperatively mounted on said base and having a line gripping jaw operatively opposed to said first named jaw, said base having a bottom, longitudinal side walls, and a transverse end wall at one end of the base connecting said side walls the tip end of the base at the other end being fashioned into and providing said first named jaw, said clip comprising a plate opposed to said bottom and hingedly mounted on and between said side walls, said plate having a marginal edge which is opposed to said first-named jaw and which constitutes and provides said second line gripping jaw.

6. The structure defined in claim 5, and wherein the means for spring-biasing the clip comprises a coil spring interposed between end portions of said bottom wall and plate, and manually regulable means whereby the tension of the spring may be selectively adjusted and set so that the responsiveness of opening of said jaws relative to line pull may be varied to meet varying line tension and releasing conditions.

7. For use in conjunction with an outrigger embodying adjustable line means, a fishing line holding pull-actuated releasing device through the medium of which a desired drop-back of the releasably held fishing line may be had comprising a base including a bottom, an end portion of which constitutes a line clamping jaw, a clip opposed to the bottom and pivotally mounted intermediate its ends on an intermediate portion of the base, one end of said clip being opposed to and movable toward and from said jaw and constituting a companion line clamping jaw, and manually adjustable spring means interposed between and protectively housed by the clip and base, said means being accessibly adjustable and such in strength that it is possible to vary the gripping and clamping action of the jaws and strength of line releasing pull from a few ounces of pull up to about ten pounds of pull, and means mounted on the end of the base opposite to the jaw-equipped ends and including eyes through the medium of which the device may be attached to lowering and raising portions of the outrigger line means.

8. For use in conjunction with an outrigger embodying lowering and raising lines; a fishing line holding and releasing device by way of which the desired drop-back of an attached fishing line may be had: comprising a base having a line gripping jaw, means on said base permitting the base to be fixedly mounted on the transom, deck or any desired stationary part of a fishing vessel, a clip hingedly mounted on said base and having a jaw opposed to and movable toward and from said first named jaw, said base being of hollow shell-like form and embodying spaced parallel longitudinal lateral side walls joined at corresponding ends by a transverse end wall, said clip being hingedly mounted intermediate its ends on intermediate portions of the side walls and being opposed to the bottom of the base and constituting a cover for the otherwise open face of the base and also defining an enclosed chamber, and spring means confined in said chamber and having an associated screw threaded component and the latter being enclosed but accessible from the exterior to permit the tension of the spring to be increased or decreased to the extent that the jaws may be set to clampingly but releasably hold the fishing line by way of a minimal one-ounce pull to a maximum ten pound pull.

9. The structure defined in claim 6 and wherein said base is provided at the end remote from the jaws with a pair of axially aligned accessible swivel eyes, said eyes being adapted to permit attachment thereto of adjacent end portions of lowering and raising lines embodied in the aforementioned outrigger.

10. The structure defined in claim 6 and wherein said base has an outstanding marginal attaching flange for connection with a stationary support and is also provided at one end adjacent the gripping jaws and beyond the same with a hollowed extension provided with a cross-member to which an end of a teaser-line may be detachably fastened.

References Cited in the file of this patent

UNITED STATES PATENTS

| | | |
|---|---|---|
| 1,682,994 | Simon | Sept. 4, 1928 |
| 2,749,649 | Fitzsimmons | June 12, 1956 |
| 2,819,555 | Jackson | Jan. 14, 1958 |

FOREIGN PATENTS

| | | |
|---|---|---|
| 19,324 | Great Britain | Dec. 2, 1889 |